Oct. 1, 1957 C. E. SOLLARS ET AL 2,808,031
PORTABLE DIPPING APPARATUS FOR ANIMALS
Filed July 1, 1955 2 Sheets-Sheet 1

INVENTORS
Clyde E. Sollars & Francis E. Sollars
BY
McMorrow, Berman + Davidson
Attorneys

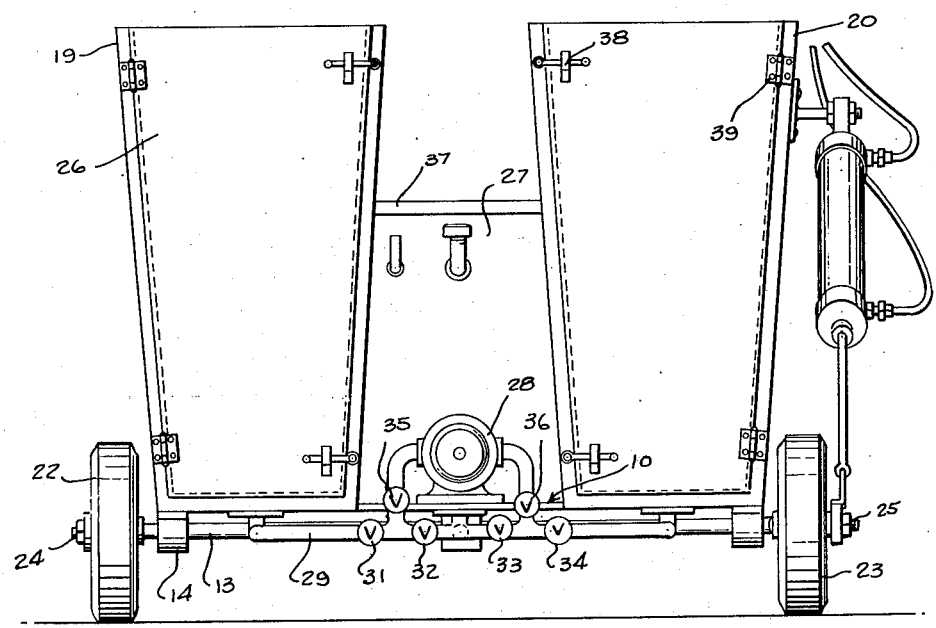
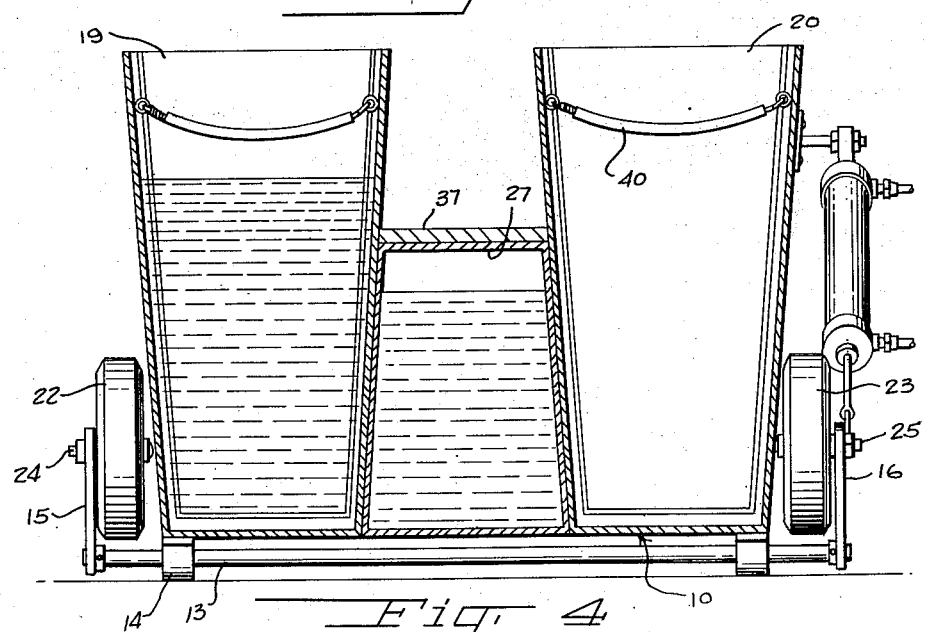

United States Patent Office 2,808,031
Patented Oct. 1, 1957

2,808,031

PORTABLE DIPPING APPARATUS FOR ANIMALS

Clyde E. Sollars, Wellington, and Francis E. Sollars, Hoopeston, Ill.

Application July 1, 1955, Serial No. 519,402

3 Claims. (Cl. 119—158)

The present invention relates to a portable apparatus for dipping animals in a treating liquid.

The primary object of the present invention is to provide a portable apparatus for submerging animals in a treating liquid for killing of parasites carried by the animals or for application to any skin diseases carried by the animals.

Another object of the present invention is to provide an apparatus having a pair of dipping tanks or vats into which animals may be driven in turn and having means for alternatingly filling and emptying the tanks or vats.

A further object of the present invention is to provide a pair of dipping vats mounted on a trailer bed or platform and having means for lowering the bed or platform to the ground so that no ramps are needed for the animals.

A still further object of the present invention is to provide a dipping apparatus for animals which is sturdy in construction and of compact size, easily towed behind a vehicle and one which may be economically manufactured and assembled.

These and other objects and advantages of the present invention will be fully apparent from the following description when taken in connection with the annexed drawings, in which:

Figure 3 is an end view looking forwardly, somewhat enlarged showing the wheels in down position, and Figure 4 is an end view in cross-section on the line 4—4 of Figure 1 showing the wheels in raised position.

Figure 1:
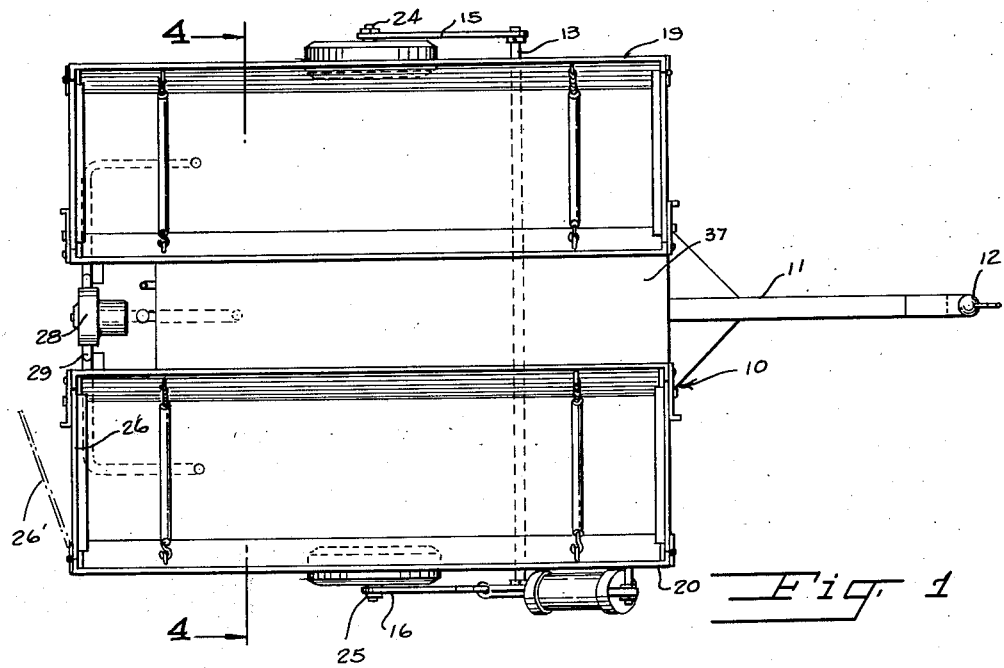
Figure 1 is a top plan view of the apparatus of the present invention.
Figure 2:
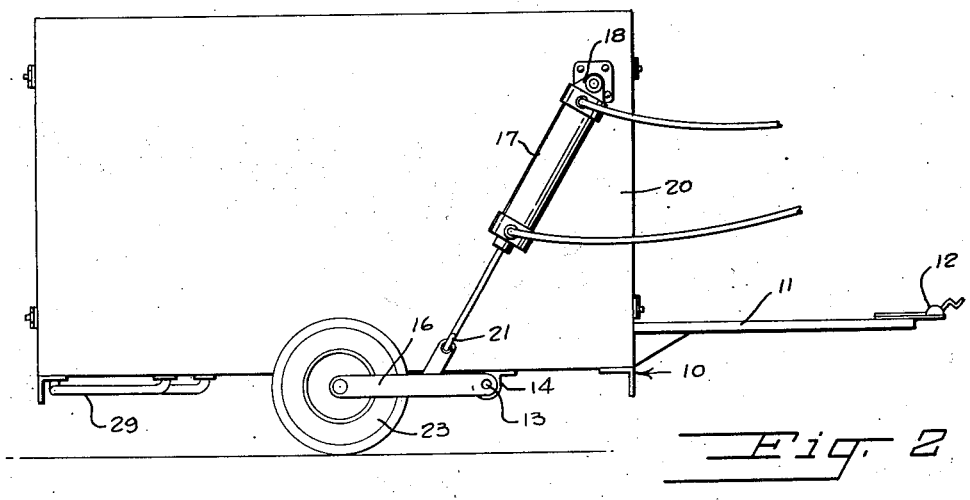
Figure 2 is a side elevational view.

Referring in greater detail to the drawings in which like numerals indicate like parts throughout the several views, the portable dipping apparatus of the present invention comprises a platform 10 having a tongue 11 at one end thereof and a hitch 12 at the end of the tongue 11 for attaching the platform to a towing vehicle. A shaft 13 extends transversely of the platform 10 intermediate the ends of the latter and spaced from the end of the platform having the tongue 11 and is mounted in spaced bearing blocks 14 secured beneath the platform 10 for rotary movement in clockwise and counter-clockwise directions, the blocks 14 also serving as ground-engaging rests.

A pair of arms 15 and 16 are arranged longitudinally of the platform 10 one on each side of the platform rearwardly of the shaft 13 and have their adjacent ends fixedly secured to the shaft 13 at the ends of the latter for swinging upward and downward movement in response to the rotary movement of the shaft 13. Means is provided for effecting the rotational movement of the shaft 13 and consists in a hydraulic lift cylinder assembly 17 having one end 18 pivotally connected to the outer side of the outer wall of one of a pair of dipping tanks or vats 19 and 20 carried on the platform and having its other end 21 pivotally connected to the one arm 16 intermediate the ends of the latter.

A wheel 22 is arranged in side by side spaced relation with respect to one side of the platform 10 and another wheel 23 is similarly arranged with respect to the other side of the platform, both of the wheels being mounted on a short shaft 24 and 25, respectively, projecting inwardly and secured to the other ends of the adjacent arms 15 and 16, respectively, and are positioned with the lower portions of their peripheries above the adjacent combined bearing block and rest 14, as seen in Figure 4, in which position the rear end of the platform rests on the ground. Upon actuation of the hydraulic cylinder assembly 17 the arms swing downwardly and cause the lower peripherial portions of the wheels to engage the ground and to elevate the platform above the ground.

The vats 19 and 20 are arranged in vertical spaced relation longitudinally of and are carried on the platform. Each vat 19 and 20 has a liquid tight door 26 at each end hingedly connected to the outer wall of each vat for swinging movement from the position closing the adjacent end of the respective vat to a position opening the vat end, the doors permitting ingress and egress of an animal to each vat.

A tank 27 for holding dipping liquid is carried by the platform between the vats 19 and 20 with one end spaced from the rear end of the platform 10 providing space on the platform for a pump 28 operatively connecting the tank to each of the vats. Pipes indicated generally by the reference numeral 29 and six valves, 31 to 36, inclusive, control the flow of liquid so that each vat may be filled as desired.

The top wall 37 of the tank is reinforced to provide a walkway for an operator so that an animal may be easily guided while it enters either of the vats. Each operable and closable door 26 has a pair of latches 38 on the side edge thereof oppositely positioned to the hinges 39. A pair of animal control chains 40 extend across each vat spaced from the ends thereof and serve to restrain movements of the animal being treated in the vat.

In use, the apparatus of the present invention is towed by a tractor, truck, or other vehicle to where the animals are to be treated, with the valves 31 to 34, inclusive, in open position, in which position they permit the dipping liquid to be at the same level in each of the vats and in the tank. The pump 28 is reversible and when driven by a source of rotative power, here not illustrated, is used to transfer the liquid as follows. If it is desired to fill the vat 19, valves 32 and 34 are closed and the valves 31, 33, 35 and 36 are opened. When the animal in the vat 19 has been treated and another animal awaits treatment in vat 20, valves 32 and 33 are closed and the pump is reversed, the liquid then traveling successively through the pipe portions from the valve 31 to the valve 35, valve 36, and valve 34, thence into the vat 20.

What is claimed is:

1. A portable dipping apparatus for animals comprising a platform, hitch means on one end of said platform for attaching said platform to a towing vehicle, spaced ground-engaging rests dependingly carried on said platform, a wheel arranged in side by side spaced relation with respect to each side of the platform with the lower portion of the periphery of each wheel above the adjacent rest and connected to the platform for movement from the side by side position to a position such that the lower peripheral portion of each wheel engages the ground and elevates the rests above the ground, a pair of dipping vats arranged in vertical spaced relation positioned longitudinally of and fixedly supported upon said platform, an openable and closable door in each of said vats for the ingress and egress of an animal to be treated, a tank for holding dipping liquid carried by said platform, and pump means operatively connecting said tank to each of said vats and selectively operable to pump the dipping liquid from said tank to either of said vats.

2. A portable dipping vat for animals comprising a platform, hitch means on one end of said platform for attaching said platform to a towing vehicle, a shaft extending transversely of and beneath said platform intermediate the ends thereof and connected to said platform for movement in clockwise and counterclockwise directions, spaced ground engaging rests carried by said shaft inwardly of said arms, a pair of arms arranged longitudinally one on each side of said platform and having their adjacent ends fixedly secured to said shaft for swinging upward and downward movements in response to movement of said shaft, means operatively connected to said shaft for effecting the movements of the latter, a wheel arranged in side by side spaced relation with respect to each side of the platform with the lower portion of the periphery of each wheel above the adjacent portion of said rest and connected to the adjacent arm for movement from the side by side position to a position such that the lower peripheral portion of each wheel engages the ground and elevates the rests above the ground upon execution of downward movement of said arms, a pair of dipping vats arranged in vertical spaced relation positioned longitudinally of and fixedly secured upon said platform, an openable and closable door in each of said vats for the ingress and egress of an animal to be treated, a tank for holding dipping liquid carried by said platform, and pump means operatively connecting said tank to each of said vats and selectively operable to pump the dipping liquid from said tank to either of said vats.

3. A portable dipping vat for animals comprising a platform, hitch means on one end of said platform for attaching said platform to a towing vehicle, a shaft extending transversely of and beneath said platform intermediate the ends thereof and connected to said platform for movement in clockwise and counterclockwise directions, spaced ground engaging rests carried by said shaft inwardly of said arms, a pair of arms arranged longitudinally one on each side of said platform and having their adjacent ends fixedly secured to said platform for swinging upward and downward movements in response to movements of said shaft, hydraulic lift means operatively connected to one of said arms for effecting the movements of said shaft, a wheel arranged in side by side spaced relation with respect to each side of the platform with the lower portion of the periphery of each wheel above the adjacent portion of said rest and connected to the adjacent arm for movement from the side by side position to a position such that the lower peripheral portion of each wheel engages the ground and elevates the rests above the ground upon execution of downward movement of said arms, a pair of dipping vats arranged in vertical spaced relation positioned longitudinally of and fixedly secured upon said platform, an openable and closable door in each of said vats for the ingress and egress of an animal to be treated, a tank for holding dipping liquid carried by said platform, and pump means operatively connecting said tank to each of said vats and selectively operable to pump the dipping liquid from said tank to either of said vats.

References Cited in the file of this patent
UNITED STATES PATENTS

| | | |
|---|---|---|
| 2,216,328 | Spangler | Oct. 1, 1940 |
| 2,595,781 | Durham | May 6, 1952 |
| 2,600,602 | Abildgaard | June 17, 1952 |
| 2,611,341 | Paris | Sept. 23, 1952 |
| 2,661,865 | Wendt | Dec. 8, 1953 |
| 2,681,811 | Green | June 22, 1954 |
| 2,703,554 | Haggard et al. | Mar. 8, 1955 |